US008710745B1

(12) United States Patent
Chang et al.

(10) Patent No.: US 8,710,745 B1
(45) Date of Patent: Apr. 29, 2014

(54) LED DRIVE CIRCUIT

(71) Applicant: Unity Opto Technology Co., Ltd., New Taipei (TW)

(72) Inventors: Wei Chang, New Taipei (TW); Chih-Hsien Wu, New Taipei (TW); Kai-Cheng Chuang, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 0 days.

(21) Appl. No.: 13/710,557

(22) Filed: Dec. 11, 2012

(51) Int. Cl.
H05B 41/00 (2006.01)
H05B 41/36 (2006.01)
H05B 37/02 (2006.01)
H05B 39/04 (2006.01)

(52) U.S. Cl.
USPC .............................. 315/127; 315/307; 315/120

(58) Field of Classification Search
USPC ................... 315/127, 121, 307, 200, 224, 120
See application file for complete search history.

(56) References Cited

U.S. PATENT DOCUMENTS

| 2011/0037387 | A1* | 2/2011 | Chou et al. ...................... 315/35 |
| 2011/0115399 | A1* | 5/2011 | Sadwick et al. ............... 315/287 |
| 2012/0200230 | A1* | 8/2012 | Esaki et al. ............... 315/200 R |
| 2013/0119881 | A1* | 5/2013 | Fang et al. ..................... 315/210 |
| 2013/0154488 | A1* | 6/2013 | Sadwick et al. ............... 315/172 |
| 2013/0293151 | A1* | 11/2013 | Puvanakijjakorn et al. .. 315/297 |
| 2013/0320872 | A1* | 12/2013 | LI et al. ......................... 315/201 |

* cited by examiner

Primary Examiner — Alexander H Taningco
Assistant Examiner — Dylan White
(74) Attorney, Agent, or Firm — Rosenberg, Klein & Lee

(57) ABSTRACT

The present invention relates to an LED drive circuit, which includes a protection unit, which is connected to an AC power supply; a rectification filter unit, which is electrically connected to the protection unit; a control unit, which has an end electrically connected to the rectification filter unit; an LED driving unit, which includes an LED, a first capacitor, and a transistor, the LED being connected in parallel with the first capacitor, the LED including a positive terminal and a negative terminal, the positive terminal of the LED being electrically connected to the rectification filter unit and the control unit; and a current detection feedback unit, which is arranged between the LED driving unit and the control unit. As such, the current detection feedback unit forms a protection circuit to prevent an increase of power caused by excessively high input voltage from an AC power supply.

6 Claims, 6 Drawing Sheets ically connected to the negative terminal of the LED, the second resistor having an opposite end electrically connected to the transistor, an end of the third resistor, and an end of the fourth resistor, wherein the third resistor is connected in parallel with the fourth resistor and an opposite end of the third resistor and an opposite end of the fourth resistor are grounded. As such, the transistor is operating in a linear zone without applying a switching frequency so as not to incorporate an electromagnetic interference filter, whereby the circuit architecture is simple and the cost is reduced. Further, the current detection feedback unit forms a protection circuit to prevent an increase of power caused by excessively high input voltage from an AC power supply.

US 8,710,745 B1

LED DRIVE CIRCUIT

FIELD OF THE INVENTION

The present invention relates to an LED (Light-Emitting Diode) drive circuit, and in particular to an LED drive circuit that allows a transistor to operate in a linear zone without applying a switching frequency so as not to incorporate an electromagnetic interference filter, wherein a current detection feedback unit forms a protection of high voltage feedback compensation so as to prevent an increase of power caused by excessively high input voltage from an AC power supply.

BACKGROUND OF THE INVENTION

Referring to FIG. 1, a conventional LED drive circuit uses a retract circuit 72 and a PWM (Pulse Width Modulator) 71 to provide a DC power source having constant current and power. A shortcoming is that the components of pulse width modulator and electromagnetic interference filter are costly.

Further, the conventional LED drive circuit does not incorporate a protection circuit of high voltage feedback compensation and if it uses a linear power source, although there is not electromagnetic interference, yet with the voltage of the increase AC power getting higher and higher, the voltage across a transistor of the circuit is getting higher and higher, making the input voltage of the AC power source excessively high and thus leading to fast increase of power (W) (see FIG. 2). Thus, it is not possible to protection the LED, leading to overheat and thus damage of the LED.

Thus, the present invention aims to provide an LED drive circuit that allows a transistor to operate in a linear zone without applying a switching frequency so as not to incorporate an electromagnetic interference filter and that comprises a protection of high voltage feedback compensation to prevent an increase of power caused by excessively high input voltage from an AC power supply.

SUMMARY OF THE INVENTION

An object of the present invention is to provide an LED drive circuit that allows a transistor to operate in a linear zone without applying a switching frequency so as not to incorporate an electromagnetic interference filter, whereby the circuit architecture is simple and the cost is reduced.

Another object of the present invention is to provide an LED drive circuit, which comprise a current detection feedback unit that forms a protection circuit to prevent an increase of power caused by excessively high input voltage from an AC power supply.

To achieve the above objects, the present invention provides an LED drive circuit, which comprises a protection unit, which is connected to an AC power supply; a rectification filter unit, which is electrically connected to the protection unit; a control unit, which has an end electrically connected to the rectification filter unit; an LED driving unit, which comprises an LED, a first capacitor, and a transistor, the LED being connected in parallel with the first capacitor, the LED comprising a positive terminal and a negative terminal, the positive terminal of the LED being electrically connected to the rectification filter unit and the control unit; and a current detection feedback unit, which is arranged between the LED driving unit and the control unit, the current detection feedback unit comprising: a first resistor, a second resistor, a third resistor, and a fourth resistor, the first resistor having an end electrically connected to an end of the second resistor and the

BRIEF DESCRIPTION OF THE DRAWINGS

The present invention will be apparent to those skilled in the art by reading the following description of a preferred embodiment thereof with reference to the drawings, in which.

DETAILED DESCRIPTION OF THE PREFERRED EMBODIMENTS

Figure 1:
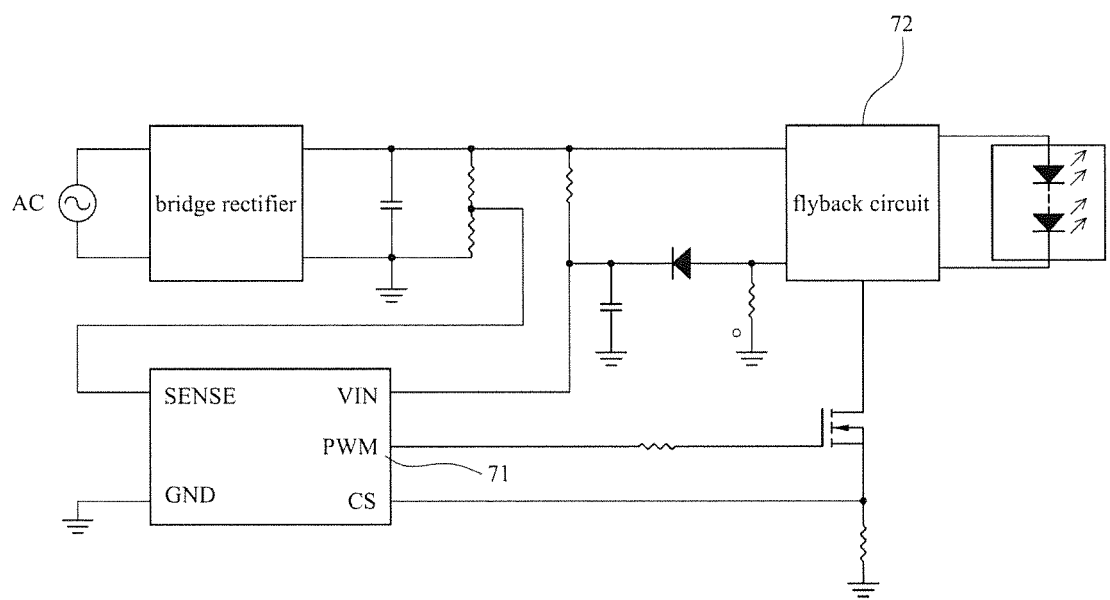
FIG. 1 is a circuit diagram of a conventional LED drive circuit.
Figure 2:
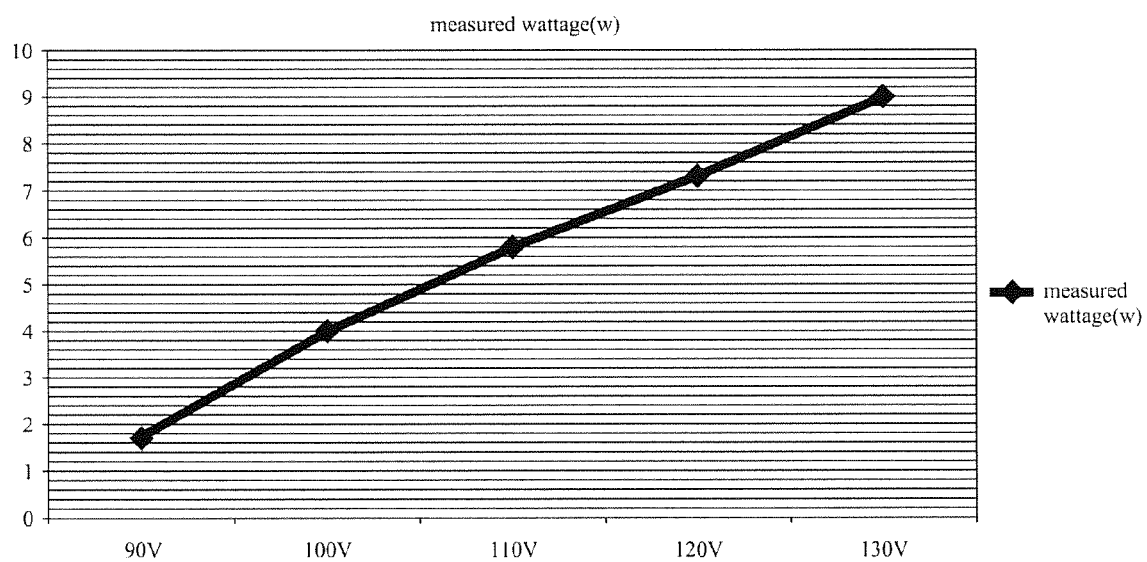
FIG. 2 is a plot showing test result of input voltage vs. output power (W) of a conventional LED drive circuit.
Figure 3:
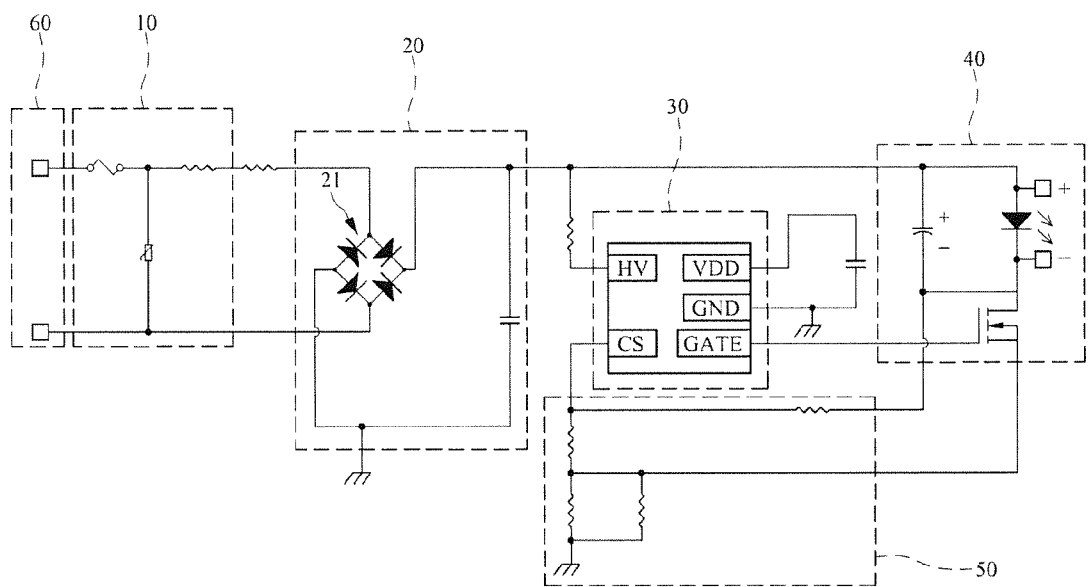
FIG. 3 is a block diagram of an LED drive circuit according to the present invention.
Figure 4:
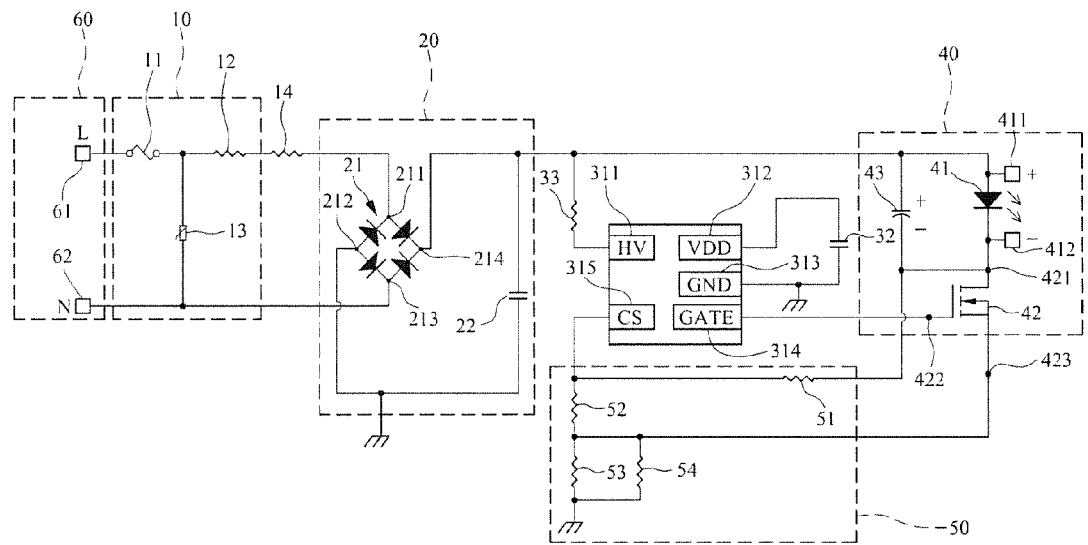
FIG. 4 is a schematic view illustrating the LED drive circuit according to the present invention.
Figure 5:
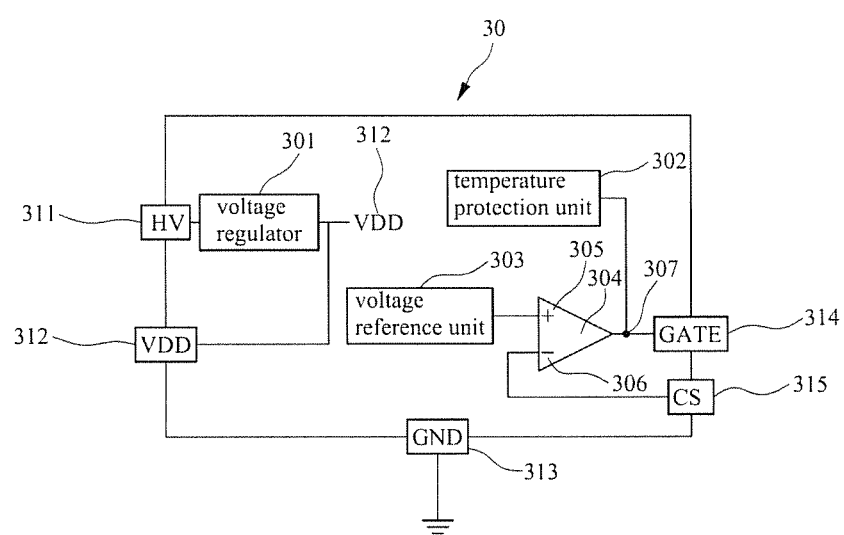
FIG. 5 is a block diagram of a control unit according to the present invention.

With reference to the drawings and in particular to FIGS. 3-5, the present invention provides an LED (Light-Emitting Diode) drive circuit, which comprises: a protection unit 10, which is connected to an AC (Alternating Current) power supply 60; a rectification filter unit 20, which is electrically connected to the protection unit 10; a control unit 30, which has an end electrically connected to the rectification filter unit 20; an LED driving unit 40, which comprises an LED 41, a first capacitor 43, and a transistor 42, wherein the LED 41 is connected in parallel with the first capacitor 43 and the LED 41 comprises a positive terminal 411 and a negative terminal 412, the positive terminal 411 of the LED 41 being electrically connected to the rectification filter unit 20 and the control unit 30; and a current detection feedback unit 50, which is arranged between the LED driving unit 40 and the control unit 30. The current detection feedback unit 50 comprises: a first resistor 51, a second resistor 52, a third resistor 53, and a fourth resistor 54. The first resistor 51 has an end electrically connected to an end of the second resistor 52 and the control unit 30. The first resistor 51 has an opposite end electrically connected to the negative terminal 412 of the LED. The second resistor 52 has an opposite end electrically connected to the transistor 42, an end of the third resistor 53, and an end of the fourth resistor 54. The third resistor 53 is connected in parallel with the fourth resistor 54. An opposite end of the third resistor 53 and an opposite end of the fourth resistor 54 are grounded. The first resistor 51, the second resistor 52, the third resistor 53, and the fourth resistor 54 provide feedback of current detection and protection of high/low voltage compensation. The control unit 30 drives the LED in a linear constant current manner.

The control unit 30 comprises: a voltage regulator 301, a voltage reference unit 303, an operational amplifier 304, and a temperature protection unit 302. Further, the control unit 30 comprises, externally, a high voltage terminal (HV) 311, a low voltage terminal (VDD) 312, a detection terminal (CS) 315, a grounding terminal (GND) 313, and a gate terminal (GATE) 314. The voltage regulator 301 has an end connected to the high voltage terminal (HV) 311. The voltage regulator 301 has an opposite end connected to the low voltage terminal (VDD) 312. The operational amplifier 304 has a positive input terminal 305, a negative input terminal 306, and an output terminal 307. The positive input terminal 305 is connected to the voltage reference unit 303. The negative input terminal 306 is connected to the detection terminal (CS) 315. And, the output terminal 307 is connected to the temperature protection unit 302 and the gate terminal (GATE) 314. Further, the gate terminal (GATE) 314 of the control unit 30 is electrically connected to the transistor 42 of the LED driving unit 40. The high voltage terminal (HV) 311 is electrically connected via a fifth resistor 33 to the rectification filter unit 20. A second capacitor 32 is connected between the low voltage terminal (VDD) 312 and the grounding terminal 313. The detection terminal (CS) 315 is electrically connected to one end of the first resistor 51 and the second resistor 52. The fifth resistor 33 controls high voltage and limits current. The second capacitor 32 filters noise.

The transistor 42 of the LED driving unit comprises a drain terminal 421, a gate terminal 422, and a source terminal 423. The gate terminal 422 of the transistor 42 is connected to the gate terminal (GATE) 314 of the control unit 30. The drain terminal 421 is connected to the negative terminal 412 of the LED 41. The source terminal 423 is connected to said opposite end of the second resistor 52 and said one end of the third resistor 53 and the fourth resistor 54. The transistor 42 comprises a metal oxide semiconductor field effect transistor (MOSFET). The control unit 30 and the current detection feedback unit 315 constrain the transistor 42 to operate in a linear zone and couple heat source of the transistor 42 to a light tray (not shown) of the LED 41 to effect heat dissipation. Further, the LED 41 is connected in parallel with the first capacitor 43, whereby the first capacitor 43 suppress voltage/current ripples of the LED 41 to provide a voltage regulation effect.

The protection unit 10 comprises: a fuse 11, a thermistor (such as a NTC thermistor) 12, and a varistor (TVR) 13. Further, the AC power supply 60 has a live terminal (L) 61 and a grounding terminal (N) 62. The fuse 11 has an end connected to the live terminal 61 of the AC power supply 60. The fuse 11 has an opposite end connected to one end of the thermistor (NTC) 12 and the varistor (TVR) 13. The varistor (TVR) 13 has an opposite end connected to the grounding terminal (N) 62 of the AC power supply 60 and the rectification filter unit 20. As such, the fuse 11 provides protection against shorting; the thermistor (NTC) 12 provides protection against current surges; and the varistor (TVR) 13 provides protection against voltage surges.

The rectification filter unit 20 comprises: a bridge rectifier 21 and a filter capacitor 22. The bridge rectifier 21 has a first pin 211, a second pin 212, a third pin 213, and a fourth pin 214. The first pin 211 is connected via a sixth resistor 14 to an opposite end of the thermistor (NTC) 12 of the protection unit 10. The second pin 212 is grounded. The third pin 213 is connected to the grounding terminal (N) 62 of the AC power supply and said opposite end of the varistor (TVR) 13. The fourth pin 214 is electrically connected to the filter capacitor 22, the control unit 30, and the LED driving unit 40. As such, the bridge rectifier 21 effects rectification for the AC power supply 60 and the filter capacitor 22 filters off high frequency noises.

Figure 6:
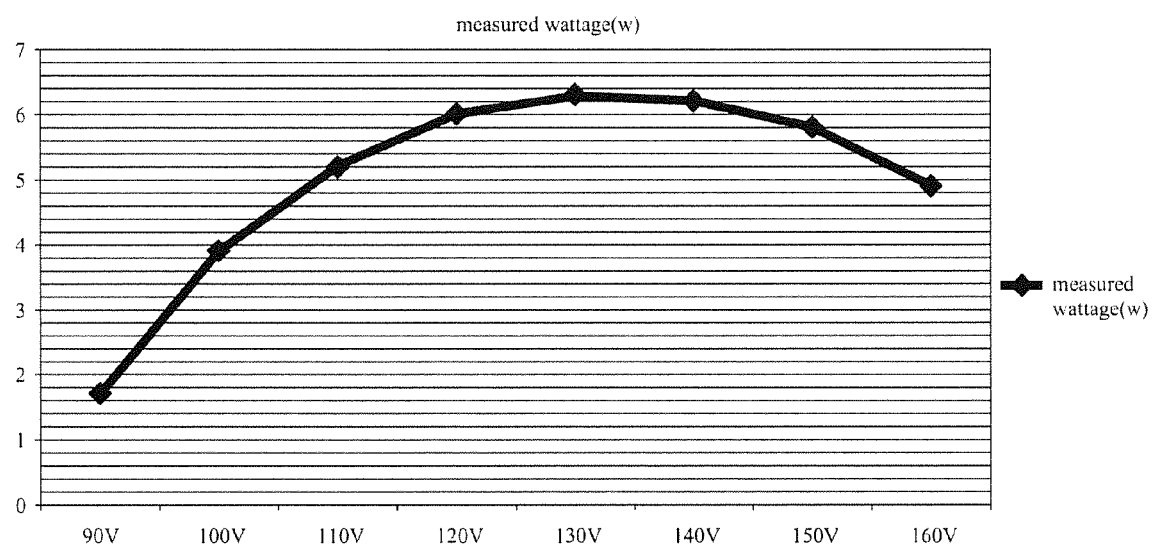
FIG. 6 is a plot showing test result of input voltage vs. output power (W) of the LED drive circuit of the present invention.

Referring to FIG. 6, a plot showing test result of input voltage vs. output power (W) of the LED drive circuit of the present invention is provided. Also referring to FIGS. 3-5, when the input AC voltage gets lower, the voltage across the transistor 42 in the circuit of the LED 41 is correspondingly getting lower. With the first resistor 51 and the second resistor 52 detecting the voltage across the transistor 42, the corresponding feedback voltage $\Delta V$ is also getting lower and the divided voltage of the third resistor 53 connected in parallel with the fourth resistor 54 causes the output current of the LED 41 to get lower, in order to form a protection circuit.

When the input AC voltage gets higher, the voltage across the transistor 42 in the circuit of the LED 41 is correspondingly getting higher. With the first resistor 51 and the second resistor 52 detecting the voltage across the transistor 42, the corresponding feedback voltage $\Delta V$ is also getting higher and the divided voltage of the third resistor 53 connected in parallel with the fourth resistor 54 causes the output current of the LED 41 to get lower, in order to form a protection circuit, preventing the excessive increase of the input AC voltage from causing an increase of the power (W).

The advantages of the present invention are as follows:

(1) The LED drive circuit according to the present invention uses a linear power supply rather than adopting a PWM approach so that the issue of electromagnetic interference (EMI) is eliminated.

(2) Due to no EMI issue, the LED drive circuit according to the present invention can reduce the cost of use safety specification associated components.

(3) The LED drive circuit according to the present invention has a power factor for linear power supply PF=0.7~0.9, because large capacitance is not arranged behind the bridge rectification and is instead connected in parallel between positive and negative terminals of the LED to effect voltage regulation and protection of the LED.

(4) When the input AC voltage gets lower, the voltage across the transistor in the circuit of the LED 41 correspondingly getting lower. With the first resistor and the second resistor detecting the voltage across the transistor, the corresponding feedback voltage $\Delta V$ is also getting lower and the divided voltage of the third resistor connected in parallel with the fourth resistor causes the output current of the LED to get lower, in order to form a protection circuit.

(5) When the input AC voltage gets higher, the voltage across the transistor in the circuit of the LED is correspondingly getting higher. With the first resistor and the second resistor detecting the voltage across the transistor, the corresponding feedback voltage $\Delta V$ is also getting higher and the divided voltage of the third resistor connected in parallel with the fourth resistor causes the output current of the LED to get lower, in order to form a protection circuit, preventing the excessive increase of the input AC voltage from causing an increase of the power (W).

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An LED drive circuit, comprising:
a protection unit, which is connected to an AC power supply;
a rectification filter unit, which is electrically connected to the protection unit;
a control unit, which has an end electrically connected to the rectification filter unit;
an LED driving unit, which comprises an LED, a first capacitor, and a transistor, the LED being connected in parallel with the first capacitor, the LED comprising a positive terminal and a negative terminal, the positive terminal of the LED being electrically connected to the rectification filter unit and the control unit; and
a current detection feedback unit, which is arranged between the LED driving unit and the control unit, the current detection feedback unit comprising: a first resistor, a second resistor, a third resistor, and a fourth resistor, the first resistor having an end electrically connected to an end of the second resistor and the control unit, the first resistor having an opposite end electrically connected to the negative terminal of the LED, the second resistor having an opposite end electrically connected to the transistor, an end of the third resistor, and an end of the fourth resistor, wherein the third resistor is connected in parallel with the fourth resistor and an opposite end of the third resistor and an opposite end of the fourth resistor are grounded.

2. The LED drive circuit as claimed in claim 1, wherein the control unit comprises: a voltage regulator, a voltage reference unit, an operational amplifier, and a temperature protection unit and the control unit also comprises, externally, a high voltage terminal, a low voltage terminal, a detection terminal, a grounding terminal, and a gate terminal, the voltage regulator having an end connected to the high voltage terminal, the voltage regulator having an opposite end connected to the low voltage terminal, the operational amplifier having a positive input terminal, a negative input terminal, and an output terminal, the positive input terminal being connected to the voltage reference unit, the negative input terminal being connected to the detection terminal, the output terminal being connected to the temperature protection unit and the gate terminal.

3. The LED drive circuit as claimed in claim 2, wherein the gate terminal of the control unit is electrically connected to the transistor of the LED driving unit, the high voltage terminal being electrically connected via a fifth resistor to the rectification filter unit, a second capacitor being connected between the low voltage terminal and the grounding terminal, the detection terminal being electrically connected to one end of the first resistor and the second resistor.

4. The LED drive circuit as claimed in claim 3, wherein the transistor of the LED driving unit comprises a drain terminal, a gate terminal, and a source terminal, the gate terminal of the transistor being connected to the gate terminal of the control unit, the drain terminal being connected to the negative terminal of the LED, the source terminal being connected to said opposite end of the second resistor and said one end of the third resistor and the fourth resistor.

5. The LED drive circuit as claimed in claim 1, wherein the protection unit comprises: a fuse, a thermistor, and a varistor, the AC power supply having a live terminal and a grounding terminal, the fuse having an end connected to the live terminal of the AC power supply, the fuse having an opposite end connected to one end of the thermistor and the varistor, the varistor having an opposite end connected to the grounding terminal of the AC power supply and the rectification filter unit.

6. The LED drive circuit as claimed in claim 5, wherein the rectification filter unit comprises: a bridge rectifier and a filter capacitor, the bridge rectifier having a first pin, a second pin, a third pin, and a fourth pin, the first pin being connected via a sixth resistor to an opposite end of the thermistor of the protection unit, the second pin being grounded, the third pin being connected to the grounding terminal of the AC power supply and said opposite end of the varistor, the fourth pin being electrically connected to the filter capacitor, the control unit, and the LED driving unit.

* * * * *